Oct. 20, 1953  E. J. LUEDERS  2,655,657
PROTECTIVE DEVICE FOR THE EYES
Filed Nov. 30, 1949
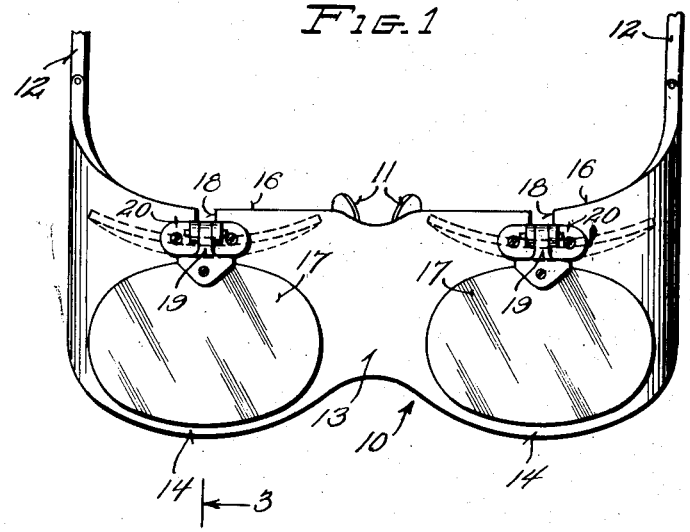
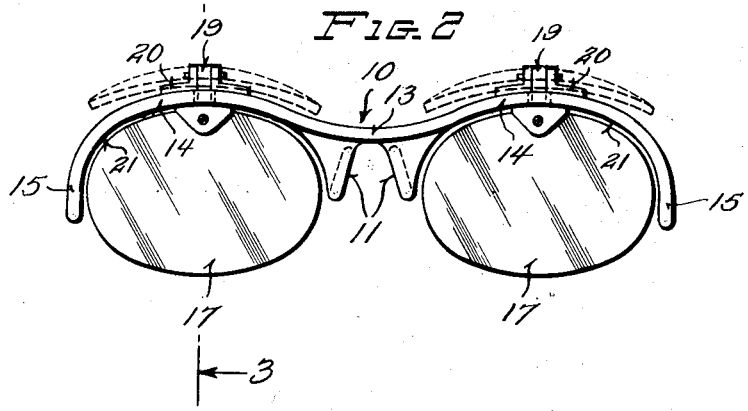
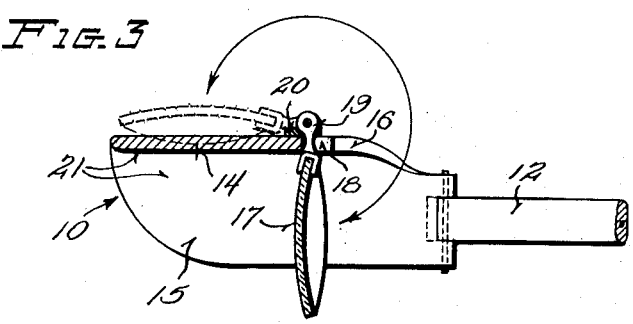
INVENTOR.
ERVIN J. LUEDERS
BY
ATTORNEY Patented Oct. 20, 1953

2,655,657

UNITED STATES PATENT OFFICE 2,655,657

PROTECTIVE DEVICE FOR THE EYES

Ervin J. Lueders, Wauwatosa, Wis.

Application November 30, 1949, Serial No. 130,119

3 Claims. (Cl. 2—12)

This invention relates to a protective device for the eyes.

The primary object of the present invention resides in the provision of a new and improved protective device for the eyes which shades them from the direct rays of the sun.

Another object of the invention resides in the provision of a protective device for the eyes which embodies a shade element adapted to extend forwardly from the forehead and temples and having a rear marginal edge shaped to conform to the contour of the frontal portion of the head of the wearer.

Another object of the invention resides in the provision of a protective device for the eyes including a shade element and a pair of colored lenses arranged for pivotal mounting on the shade element in a manner to permit their assuming a storage or inactive position above the shade element or an active position below the shade element.

A further object of the invention lies in the provision of a protective device for the eyes in which the shape of the lenses and the shade element are so coordinated as to present a pleasing appearance as well as to provide material protection against breakage of the lenses.

A further object lies in the provision of a protective device for the eyes in which the under surface of the shade element is of light diffusing character so as to prevent the reflection of light rays into the eyes of the wearer.

A further object lies in the provision of a protective device for the eyes which may be used selectively as an eye shade alone or as a shade for the sun glasses which are incorporated in the device.

Other objects and advantages of the present invention will become manifest from the following description of an illustrative embodiment of the same.

In the drawing:

Figure 1 is a top plan view of a protective device for the eyes embodying the teachings of the present invention and showing the colored lenses in full lines in their storage position above the shade portion of the device; the dotted line showing of the lenses illustrates them swung into their active position beneath the shade;

Fig. 2 is a front elevational view of the device shown in Fig. 1 with the colored lenses shown in full lines in their active position under the shade portion of the device; the dotted line showing of the lenses illustrating them swung into their inactive or storage position; and Fig. 3 is a vertical sectional view taken substantially on the line 3—3 of Fig. 2 showing the pivotal mounting of the colored lense.

Before entering into a detailed description of the present invention, a brief discussion of the merits of the idea may serve to emphasize its real advantages over ordinary sun glasses.

In ordinary sun glasses, the direct rays of the sun are permitted to strike the eyes of the wearer either by passing between the top of the glasses and the eye brows or at the open sides of the glasses. In either case, it is quite apparent that the sun glasses of ordinary design afford only partial protection against the sunlight due to the fact that they do not fit closely enough to the head of the wearer to preclude the admission of light around their edges. Since the light rays which strike the eyes without passing through the lenses are undimmed in brilliance they materially reduce the effectiveness of the sun glasses of usual present well known form.

In applicant's protective device for the eyes, it will be noted that the shade element is provided with a rear marginal edge having a contour adapted to conform closely to the frontal shape of the head and that the outer ends of the shade are turned downwardly and extend forwardly from the temples in a manner to preclude the direct rays of the sun from contacting the eyes of the wearer. In addition to the fact that the shade affords protection against the direct rays of the sun reaching the eyes, it also shades the colored lenses of the device when they are swung into active position below the shade and directly before the eyes. With the structure afforded by the present device, it will readily be understood that greater protection is provided for the eyes by reason of the fact that no direct brilliant rays of sunlight are permitted to contact the eyes of the wearer.

Referring more particularly to the drawing, the protective device for the eyes comprises a shade element 10 formed of opaque material such as plastic or the like and adapted for support on the head of the wearer through the medium of a nose contacting bridge portion 11 formed integral with the shade and a pair of temple bars 12 hingedly mounted adjacent the outer and rearward extremities of the shade 10.

The shade 10 includes a central portion 13 which extends forwardly from the top of the bridge portion 11, intermediate portions 14 extending laterally from both sides of the central portion 13, and outer portions 15 which extend downwardly and rearwardly from the intermediate portions 14. As clearly illustrated in Fig. 2 of the drawing, the shade 10 is of concavo-convex form. The concavity of the portions 14 and 15 on their under and inner sides respectively conform closely to the peripheral contour of the top portions of the lenses of the sun glasses; while the convexity of the top surface of the portions 14 conform closely to the concavity of the lenses from side to side, for a purpose to be hereinafter more specifically described.

The shade 10 is provided with a rear marginal edge surface 16 adapted to contact the surface of the head of the wearer in a manner to preclude the admission of light between the shade and the head. To this end, the contour of the rear marginal edge of the shade 10 is shaped to conform closely to the frontal shape of the head.

Suitably shaped sun glass lenses 17 are adapted for pivotal mounting on the shade 10. These lenses 17 are mounted in a manner to permit their being selectively swung into either active position beneath the shade 10 or into inactive position above the shade 10. In order to have the lenses 17 assume their proper positions before the eyes of the user, a notch 18 is cut into the intermediate portion 14 on each side of the shade 10. This notch 18 serves to permit the passage of a movable element 19 of the hinge 20 to a position in which the lense 17 lies in a substantially vertical position before the eyes of the wearer and at the proper distance away from the eyes. The movable element of the hinge 20 is provided with the usual lense gripping means and the stationary portion of the hinge 20 is attached to the top surface of the shade 10 in any approved manner, such as by the use of screws.

From the foregoing detailed description, it will be noted that an improved protective device has been provided for the eyes, in which the wearer may selectively use the device as an eye shade alone or as a shade for sun glasses. Many types of work are done under strong artificial lights where a shade is highly beneficial to the comfort of the worker. In these instances, the user may swing the lenses 17 into their inactive, or storage, position above the shade 10 and still have the benefit of protecting his eyes from the effects of strong light and thereby materially reduce fatigue to the eyes. In instances where the user is outdoors the shade alone may be sufficient to give him the desired comfort, however, if it is desirable to provide further protection for the eyes, the lenses 17 may be swung into their active position beneath the shade and the user is completely protected against having the direct rays of the sun contact his eyes.

As a means of further protection against the admission of bright light to the eyes of the wearer, the under surface of the shade 10 is provided with a dull or light diffusing finish 21.

While the foregoing specification describes a preferred form of the present invention, it is to be understood that various changes may be made in its embodiment without departing from or sacrificing any of the advantages hereinafter claimed.

I claim:

1. A protective device for the eyes to shield them against the admission of downwardly or sidewardly directed rays of light, said device comprising a rigid shade element including a head conforming rear marginal edge and a forwardly extending portion having a concavo-convex form with the inner under surface of said element formed by a warped plane including a pair of laterally spaced concaved portions and the outer upper surface of said element formed by a warped plane including a pair of laterally spaced convex portions, and a pair of colored lenses hingedly mounted on said shade element and movable for selective positioning thereon either in active position beneath said shade element or in inactive position above said shade element, said lenses having a lateral curvature to conform substantially with the curvature of the outer upper surface of said shade element when they are swung to their inactive position above said shade element and having an upper peripheral contour to conform substantially to the curvature of the inner under surface of said shade element when they are swung to their active position beneath said shade element.

2. A protective device for the eyes to shield them against the admission of downwardly or sidewardly directed rays of light, said device comprising a rigid shade element including a head conforming rear marginal edge and a forwardly extending portion having concavo-convex form with its ends disposed in downwardly directed planes and its intermediate portions including a pair of laterally spaced concaved surfaces, and a pair of laterally spaced colored lenses hingedly mounted on said shade element and movable for selective positioning thereon either in active position beneath said shade or in inactive position above said shade, said lenses having a lateral curvature to conform substantially with the curvature of the top surface of said shade when they are swung to their inactive position and having an upper peripheral contour to conform substantially with the curvature of the under side of said shade when they are swung to their active position.

3. A protective device for the eyes to shield them against the admission of downwardly or sidewardly directed rays of light, said device comprising a rigid shade element including a head conforming rear marginal edge and a forwardly extending portion having concavo-convex form terminating at its lateral extremities in vertically disposed planes having rearwardly directed portions adapted to lie adjacent the temples, and a pair of colored lenses hingedly mounted adjacent the rear marginal edge of said shade element and movable for selective positioning thereon either in active position beneath said shade or in inactive position above said shade, said lenses having a lateral curvature to conform substantially with the curvature of the upper outer surface of said shade when they are swung to their inactive position and having an upper peripheral contour to conform substantially with the curvature of the inner under surface of said shade when they are swung to their active position, thereby forming a device affording out of vision positioning for said lenses when the device is used as an eye shade or in vision positioning for said lenses when the device is used as a shade for said colored lenses.

ERVIN J. LUEDERS.

References Cited in the file of this patent

UNITED STATES PATENTS

| Number | Name | Date |
|---|---|---|
| 1,313,469 | Crossley | Aug. 19, 1919 |
| 1,564,663 | Galligan | Dec. 8, 1925 |
| 1,635,328 | Kintz | July 12, 1927 |
| 1,696,193 | Gross | Dec. 25, 1928 |
| 1,722,120 | Wickland | July 23, 1929 |

FOREIGN PATENTS

| Number | Country | Date |
|---|---|---|
| 32,884 | Austria | May 11, 1908 |
| 612,827 | France | Aug. 9, 1926 |
| 775,826 | France | Oct. 15, 1934 |
| 744,586 | France | Jan. 26, 1933 |
| 467,299 | Great Britain | June 15, 1937 |